United States Patent
Edgar et al.

(10) Patent No.: US 6,286,056 B1
(45) Date of Patent: Sep. 4, 2001

(54) DATA STORAGE DEVICE WITH SMALL COMPUTER SYSTEM INTERFACE PROVIDING PERSISTENT RESERVATIONS

(75) Inventors: Brian T. Edgar; Gerald A. Houlder, both of Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/219,274

(22) Filed: Dec. 23, 1998

Related U.S. Application Data
(60) Provisional application No. 60/090,781, filed on Jun. 26, 1998.

(51) Int. Cl.[7] .............................. G06F 3/00; G06F 12/00; G06F 12/14; G06F 12/16
(52) U.S. Cl. .................................... 710/5; 710/6; 711/100
(58) Field of Search .............................. 710/5, 6, 11, 13; 711/100, 202

(56) References Cited

U.S. PATENT DOCUMENTS

| | | | |
|---|---|---|---|
| 5,844,905 | * 12/1998 | McKay et al. | 370/443 |
| 5,974,544 | * 10/1999 | Jeffries et al. | 713/1 |
| 5,996,027 | * 11/1999 | Volk et al. | 710/13 |
| 5,996,030 | * 11/1999 | Ofer | 710/19 |
| 6,128,717 | * 10/2000 | Harrison et al. | 711/202 |

OTHER PUBLICATIONS

"Information Technology—SCSI Primary Commands—2 (SPC-2)", T10 Project 1236-D, Revision 5, Sep. 23, 1998, pp. 1–180.

* cited by examiner

*Primary Examiner*—Thomas Lee
*Assistant Examiner*—Rehana Perveen
(74) *Attorney, Agent, or Firm*—Westman, Champlin & Kelly, P.A.

(57) ABSTRACT

A disc drive includes a disc which is coupled to a spindle motor for rotation. A head in the disc drive is configured to read and write data upon the disc. The disc drive also includes a controller which is couplable to an SCSI interface, and adapted to store persistent reservation information on the disc.

Methods are also provided by which SCSI compliant devices can respond to persistent reservations commands in accordance with the present invention.

14 Claims, 5 Drawing Sheets

DATA STORAGE DEVICE WITH SMALL COMPUTER SYSTEM INTERFACE PROVIDING PERSISTENT RESERVATIONS

CROSS-REFERENCE TO RELATED APPLICATION

This Application claims the priority of an earlier filed co-pending Provisional Patent Application Serial No. 60/090,781, filed Jun. 26, 1998, entitled SCSI PERSISTENT RESERVE IMPLEMENTATION.

FIELD OF THE INVENTION

The present invention relates to devices which operate in accordance with a small computer system interface (SCSI). More specifically, the present invention relates to SCSI-compliant devices which implement persistent reservations.

BACKGROUND OF THE INVENTION

One of the hallmarks of modern computers is configurability. A computer can be configured to provide a variety of specific functions simply by attaching various peripheral devices. For example, graphical images can be digitized and stored on a computer by employing a scanner, and a storage device. By adding a printer, the scanned, stored graphical image can be printed. In order to enhance system configurability, a variety of interface standards have been created, which allow conforming devices to be coupled to one another. One such interface is known as the small computer system interface (SCSI).

SCSI (pronounced "scuzzy"), and more particularly SCSI-3 defines both the physical interconnections between compliant devices, and the commands which may pass between them. Devices which comply with the SCSI standard can include direct access devices; sequential access devices; printer devices; processor devices; write once read multiple devices; CD devices; scanner devices; optical memory devices; media changer devices; communication devices; storage array devices; enclosure services devices; and simplified direct-access devices.

In a given computer system, a variety of SCSI compliant devices may be coupled to one another through a SCSI interface. In order to ensure efficient operation of the interconnected SCSI devices, a variety of commands are implemented that establish reservations which may be used to restrict the execution of commands to a given device or a portion thereof. In this manner, the various devices act as both clients and servers to one another such that they are able to share and protect data or resources.

The SCSI-3 standard set implements a type of reservation known as persistent reservations. Such reservations differ from reservations of previous SCSI implementations in that persistent reservations survive through a power-loss condition or reset condition. For example, a storage device in accordance with SCSI-3 may be exclusively reserved for a client such as a host processor. If for some reason the system loses power, upon power-up the storage device will still be exclusively allocated for the host processor. There are generally two types of persistent reservation commands: Persistent Reserve In commands, which are used to obtain information about persistent reservations, and Persistent Reserve Out commands which are used to set various persistent reservations. The use of persistent reservations provides enhanced interoperability of SCSI-devices. However, there exists a need to provide an efficient implementation of persistent reservations in SCSI-compliant devices.

SUMMARY OF THE INVENTION

A disc drive includes a disc which is coupled to a spindle motor for rotation. A head in the disc drive is configured to read and write data upon the disc. The disc drive also includes a controller which is couplable to an SCSI interface, and adapted to store persistent reservation information on the disc.

Methods are also provided by which SCSI compliant devices can respond to persistent reservations commands in accordance with the present invention.

These and various other features as well as advantages which characterize the present invention will be apparent upon reading of the following detailed description and review of the associated drawings.

DETAILED DESCRIPTION OF THE PREFERRED EMBODIMENTS

Although various aspects of the present invention are related to a wide variety of SCSI devices, the present invention will be described with respect to a disc drive. However, the present invention is not limited to disc drives. Information on an implementation of persistent reservations in SCSI can be found in a proposed command set for SCSI-3, entitled "Information technology—SCSI Primary Commands—2 (SPC-2)", working draft ANSI standard T10/ 1236-D Revision 5, which was submitted to NCITS Technical Committee T10 standards body. A summary of persistent reservation commands is provided in the attached appendix.

Figure 1:
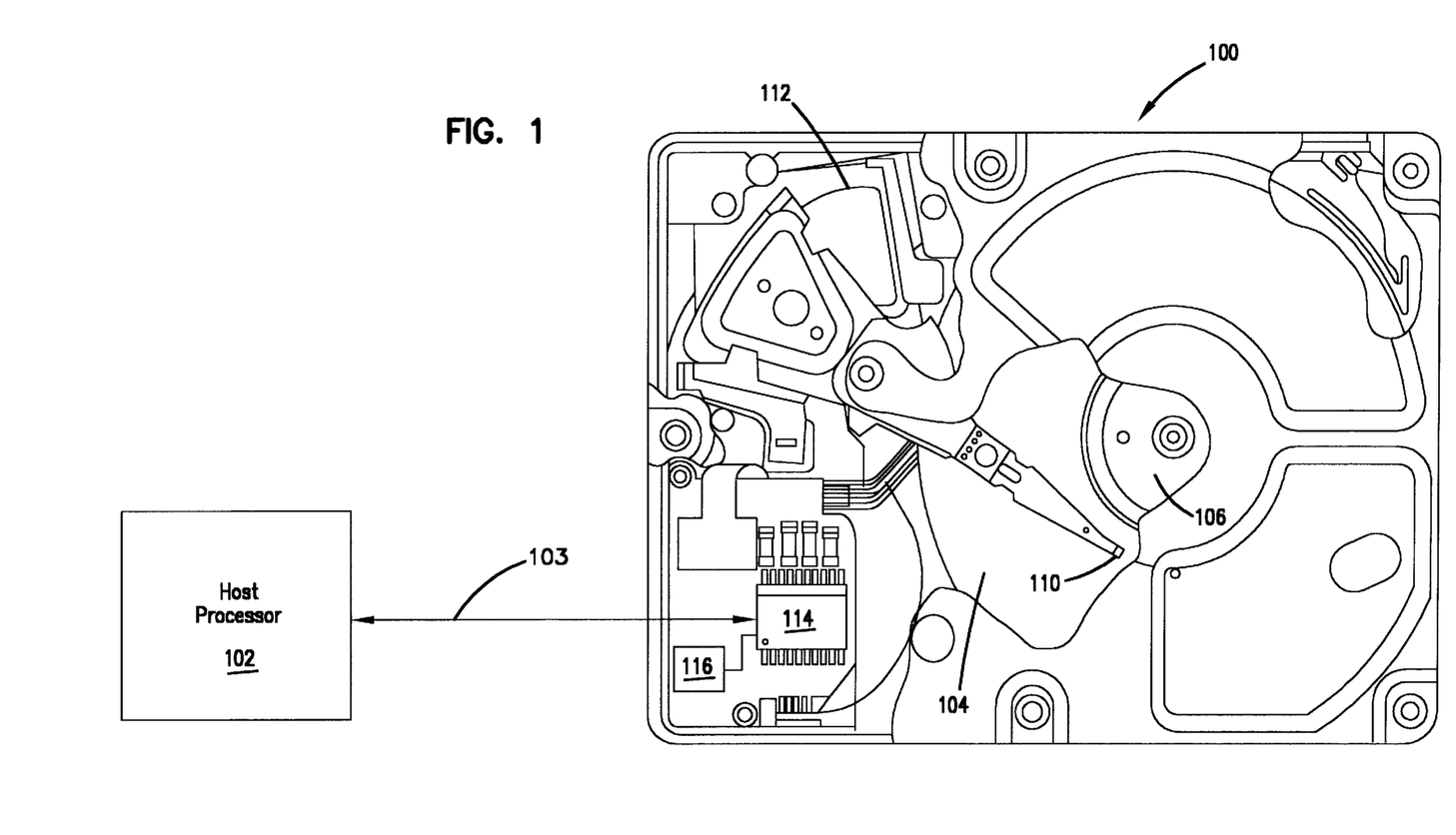
FIG. 1 is a block diagram of a storage drive coupled to a host processor in accordance with the present invention.

FIG. 1 is a block diagram of storage drive 100 coupled to host processor 102 through SCSI interface 103, in accordance with the present invention. Storage drive 100 is coupled to host-processor 102 such that processor 102 can transfer data to and read data from storage drive 100. Storage drive 100 includes disc 104, spindle 106, a spindle motor (not shown), transducer head 110, actuator 112, controller 114, and volatile memory 116.

Disc 104 is fixed about spindle 106. Spindle 106 is coupled to the spindle motor such that energization of spindle motor 108 causes spindle 106 and disc 104 to rotate. When disc 104 rotates, transducer head 110 rises above disc 104 and is magnetically or optically coupled to the surface of disc 104. Actuator 112 is coupled to controller 114 and is adapted to move transducer head 110 across the surface of disc 104 in response to an actuation signal from controller 114. Controller 114 in addition to being coupled to actuator 112 is coupled to the spindle motor, host processor 102, and volatile memory 116. Controller 114 is operatively couplable to SCSI bus 103 and adapted, through hardware, software, or a combination thereof, to communicate over SCSI bus 103 with SCSI-compliant devices such as host processor 102. Controller 114 is coupled to volatile memory 116 such that volatile memory 116 can store SCSI-related information. Volatile memory 116 can be any memory which is not able to store data across a power loss. The SCSI-related information can include persistent reservation information, Activate Persistence Through Power Loss (APTPL) state information, or other appropriate information.

Controller 114 is adapted to store persistent reservation information on disc 104. Further, controller 114 can provide SCSI operation during periods when persistent reservation information may not be accessible from disc 104. For example, controller 114 can receive a persistent reservation command and responsively determine if the persistent reservation information on disc 104 is known. If such information is not known, controller 114 selectively responds to the command with a CHECK CONDITION response. Controller 114 can also provide further information related to reasons why persistent reservation information is not known. For example, such information can include that disc 104 is NOT READY (such as when it is not spinning) or that disc 104 suffers from a MEDIUM FORMAT CORRUPT condition. Controller 114 utilizes volatile memory 116 to track the state of persistent reservation information as stored on disc 104. Essentially, volatile memory 116 stores a duplicate of the persistent reservation information which is stored on disc 104. By mirroring the persistent reservation information, controller 114 may be able to respond to SCSI commands inquiring about persistent reservation information even during periods when disc 104 is not accessible.

Figure 2:
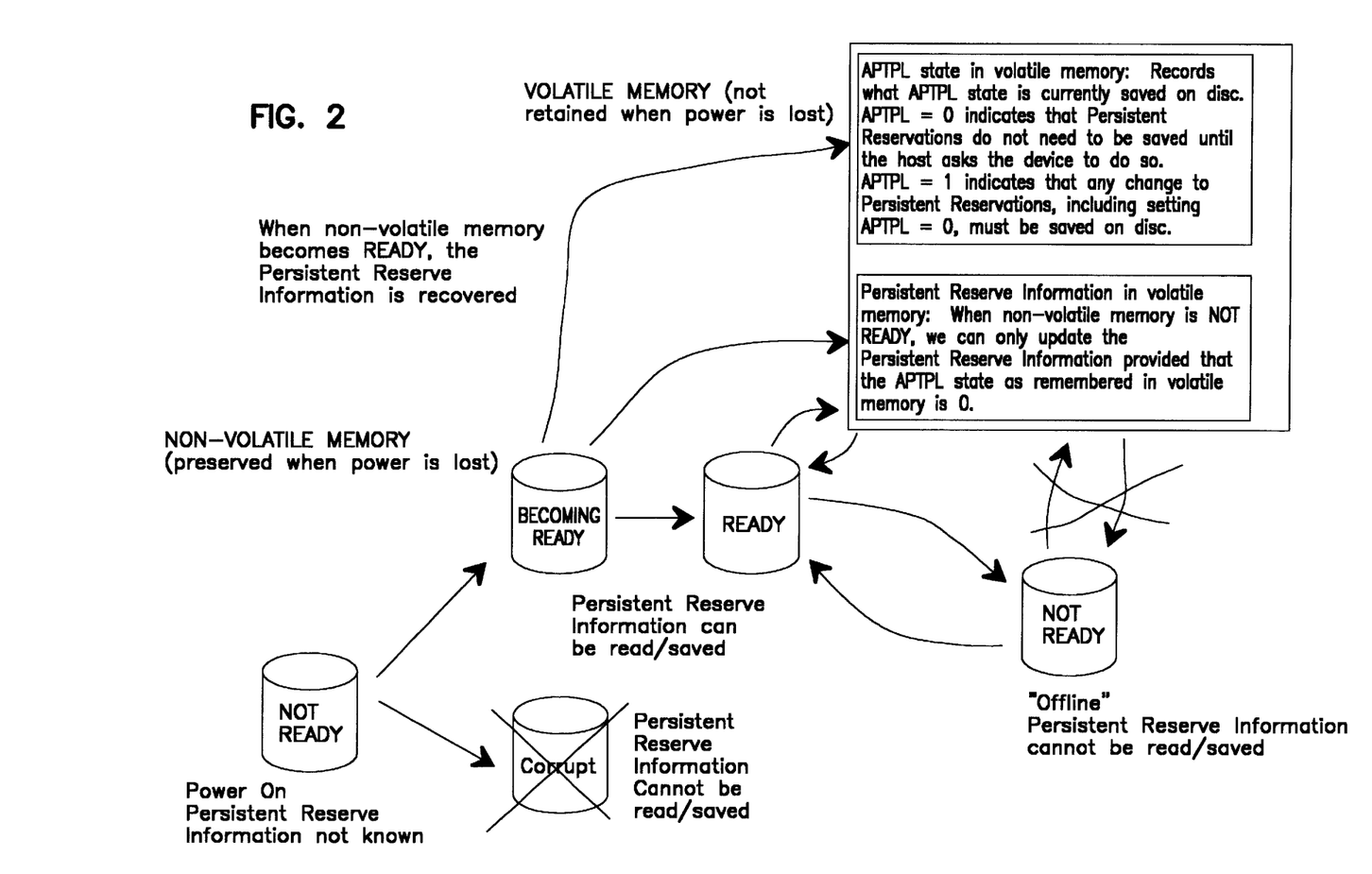
FIG. 2 is a state diagram of a storage device in accordance with the present invention.

As stated above, volatile memory 116 can also store APTPL state information. This information is indicative of whether persistent reservation information stored in volatile memory 116 needs to be saved on disc 104, as illustrated in FIG. 2. For example, an APTPL value of zero can indicate that persistent reservations stored in volatile memory 116 do not need to be saved until host processor 102 requests controller 114 to do so. An APTPL value of one can indicate that any change to persistent reservations, including setting APTPL to zero, must be saved on disc 104.

Volatile memory 116 can also contain information indicative of whether persistent reservation information on the disc could be read or written successfully on the most recent attempt, or if volatile memory 116 has been cleared (such as from a power loss, or reset) since the most recent attempt. In such an instance, data stored in volatile memory 116 can indicate that the state of persistent reservations as stored on disc 104 is unknown. Preferably, controller 114 also uses volatile memory 116 to track the current APTPL state as indicated by the most recently received PERSISTENT RESERVE OUT command specifying the register for which the APTPL was valid.

Figure 3:
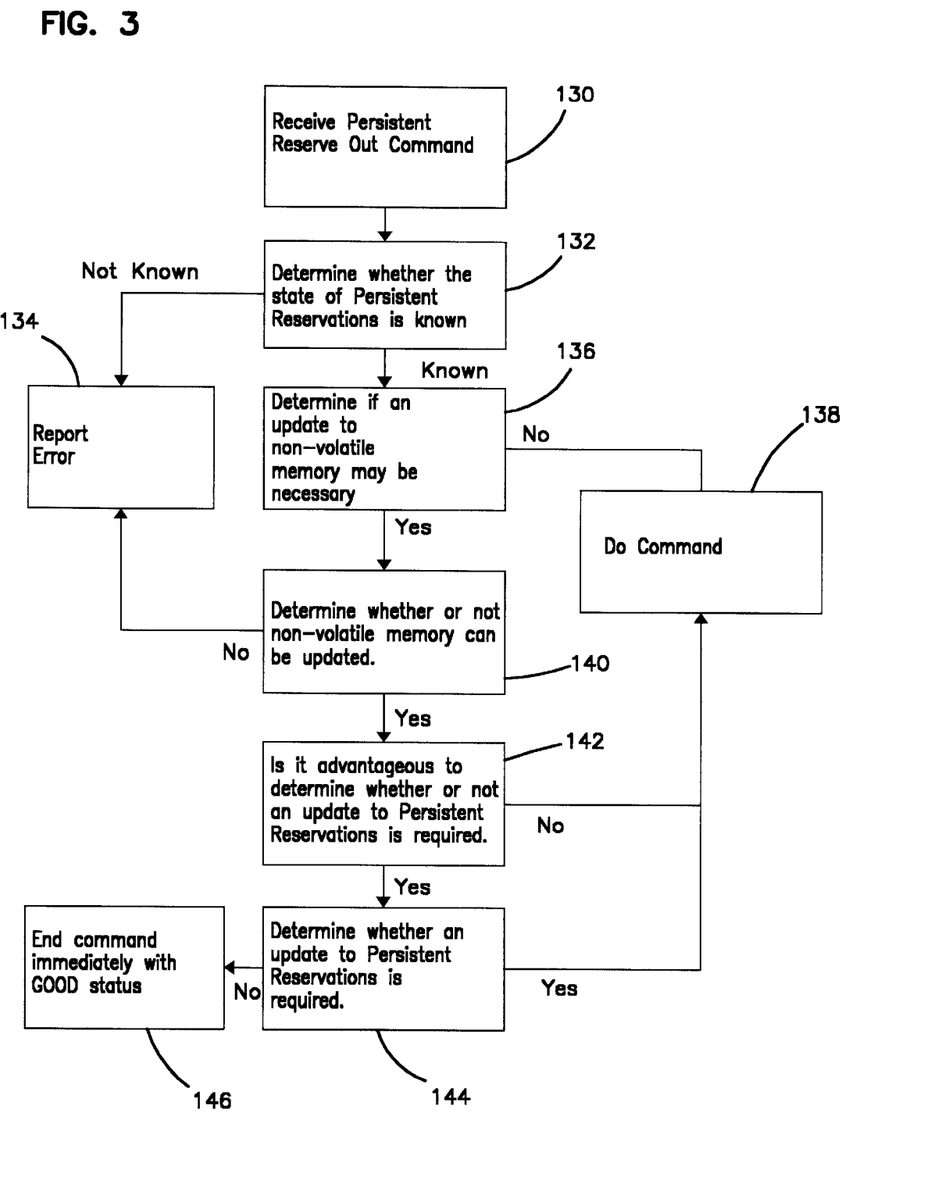
FIG. 3 is a flow chart of a sequence of steps illustrating device response to a PERSISTENT RESERVE OUT command in accordance with the present invention.

FIG. 3 illustrates steps through which a device in accordance with the present invention can respond to a PERSISTENT RESERVE OUT command. Upon power-up, the APTPL state is read from the disk. At block 130 controller 114 receives a PERSISTENT RESERVE OUT command. As indicated at block 132, controller 114 then determines whether the state of persistent reservations is known. If the state of persistent reservations is not known, controller 114 passes to block 134 and terminates the command by reporting an error. If during block 132, the state of persistent reservations is known, then controller 114 determines if an update to non-volatile memory, such as disc 104, may be necessary, as indicated at block 136. This determination is based upon the current APTPL state stored in the volatile memory 116 and an APTPL value in a parameter list (which is also stored in volatile memory 116). If such update may not be necessary, then controller 114 passes to block 138 and executes the received command. Thus, if the state of persistent reservations as stored on disc 104 is remembered in volatile memory 116, and the APTPL (current state and parameter list APTPL value) indicate that disc 104 need not be updated, then the command can still execute by updating persistent reservation information in volatile memory 116.

However, if during block 136, controller 114 determines that an update to the non-volatile memory may be necessary, then controller 114 determines whether the non-volatile memory can be updated, as indicated at block 140. If the non-volatile memory cannot be updated, controller 114 terminates the command by reporting an error as indicated at block 134. The error can be reported as CHECK CONDITION with sense data reflecting a cause of the inaccessibility of the non-volatile memory such as MEDIUM FORMAT CORRUPT. If during block 140, controller 114 determines that the non-volatile memory can be updated, then controller 114 determines whether it is advantageous to determine whether a persistent reservation update is required, as indicated at block 142. If such a determination is not advantageous, controller 114 passes to block 138 and executes the command. However, if the determination is advantageous, then controller 114 will pass to block 144 to determine whether an update to the persistent reservations is required. If an update is not required, controller 114 terminates the command returning a GOOD status, as indicated at block 146. If an update to the persistent reservations is required, then controller 114 passes from block 144 to block 138 to execute the command.

As can be seen, if controller 114 determines that the non-volatile memory is inaccessible, controller 114 can respond to the received command with an error condition even though the received command does not require an update to the non-volatile memory. Further, during periods when persistent reservation information is available from volatile memory 116, but disc 104 is inaccessible, persistent reservations will still be enforced by controller 114.

Another aspect of the present invention includes the behavioral characteristics of storage device 100 in response to a FORMAT UNIT command received through SCSI interface 103. As stated above, persistent reservation information is preferably stored on disc 104. Such persistent reservation information is stored on an area of disc 104 which is not affected (i.e. not formatted) upon the execution of a FORMAT UNIT command. If this were not case, the format unit command would overwrite the persistent reservation information and cause a loss of such information. A further aspect of the invention includes the adaptation of controller 114 such that controller 114 can, in response to the FORMAT UNIT command, determine if the state of persistent reservation information on disc 104 is known. If controller 114 receives a FORMAT UNIT command through SCSI interface 103, and the persistent reservation information is not known at the time the command is executed, the persistent reservation information on disc 104 and in volatile memory 116 will be initialized to reflect zero registrants and the APTPL state will be updated to indicate that persistent reservations do not need to saved until host processor 102 requests controller 114 to do so. Until the disc state is changed, storage device 100 will continue to remember the APTPL state as zero across power cycles.

Another aspect of the present invention includes the prioritization of error conditions. Specifically, certain errors which occur in devices of the present invention are given different priorities. For example, for all commands except PERSISTENT RESERVE OUT, the state of persistent reservations is checked before the Command Descriptor Block (CDB) fields are checked. RESERVATION CONFLICT status or CHECK CONDITION status indicating ignorance as to the state of persistent reservation information is returned before the CDB fields are examined. Further, for the PERSISTENT RESERVE OUT command, the reporting of CHECK CONDITION can take precedence over the reporting of RESERVATION CONFLICT.

Another aspect of the present invention includes the response of controller 114 to a received PERSISTENT RESERVE OUT command requesting register service action. When controller 114 receives such a command, controller 114 determines if there are sufficient resources on the non-volatile memory, such as disk 104, to manage an additional key. If sufficient resources do not exist to manage the additional key, controller 114 responds to the command by reporting an ILLEGAL REQUEST. This feature is especially advantageous in Fibre Channel Arbitrated Loop (FC-AL) implementations of SCSI where stale reservations (i.e. no longer used by any initiator) continue to require storage space in the non-volatile memory.

Another aspect of the present invention includes the specific effects of read and write restrictions on SCSI-compliant device interactions. For example, a read restriction can be imposed against an initiator for the entire logical unit (such as storage device 100). An initiator against whom a read restriction is imposed cannot perform a transfer from the storage medium or cache of the logical unit to the initiator. Commands requesting such transfer result in a RESERVATION CONFLICT. A write restriction can be imposed against an initiator for the entire logical unit. An initiator against whom a write restriction is imposed cannot perform a transfer from the initiator to the storage medium or cache of the logical unit. Commands requesting such transfer result in a RESERVATION CONFLICT. If an initiator has no restrictions, no command from that initiator to logical unit are terminated with a RESERVATION CONFLICT. If, however, an initiator does not have any access to the logical unit due to a persistent reservation, all commands from that initiator to the logical unit are terminated with RESERVATION CONFLICT status with the exception of REQUEST SENSE, INQUIRY, PERSISTENT RESERVE IN, REPORT LUNS, and some cases of PERSISTENT RESERVE OUT. Further, if an initiator has read only access to a logical unit, the logical unit will accept READ (6), READ (10), VERIFY and READ LONG commands in addition to the commands listed for no access.

Figure 4:
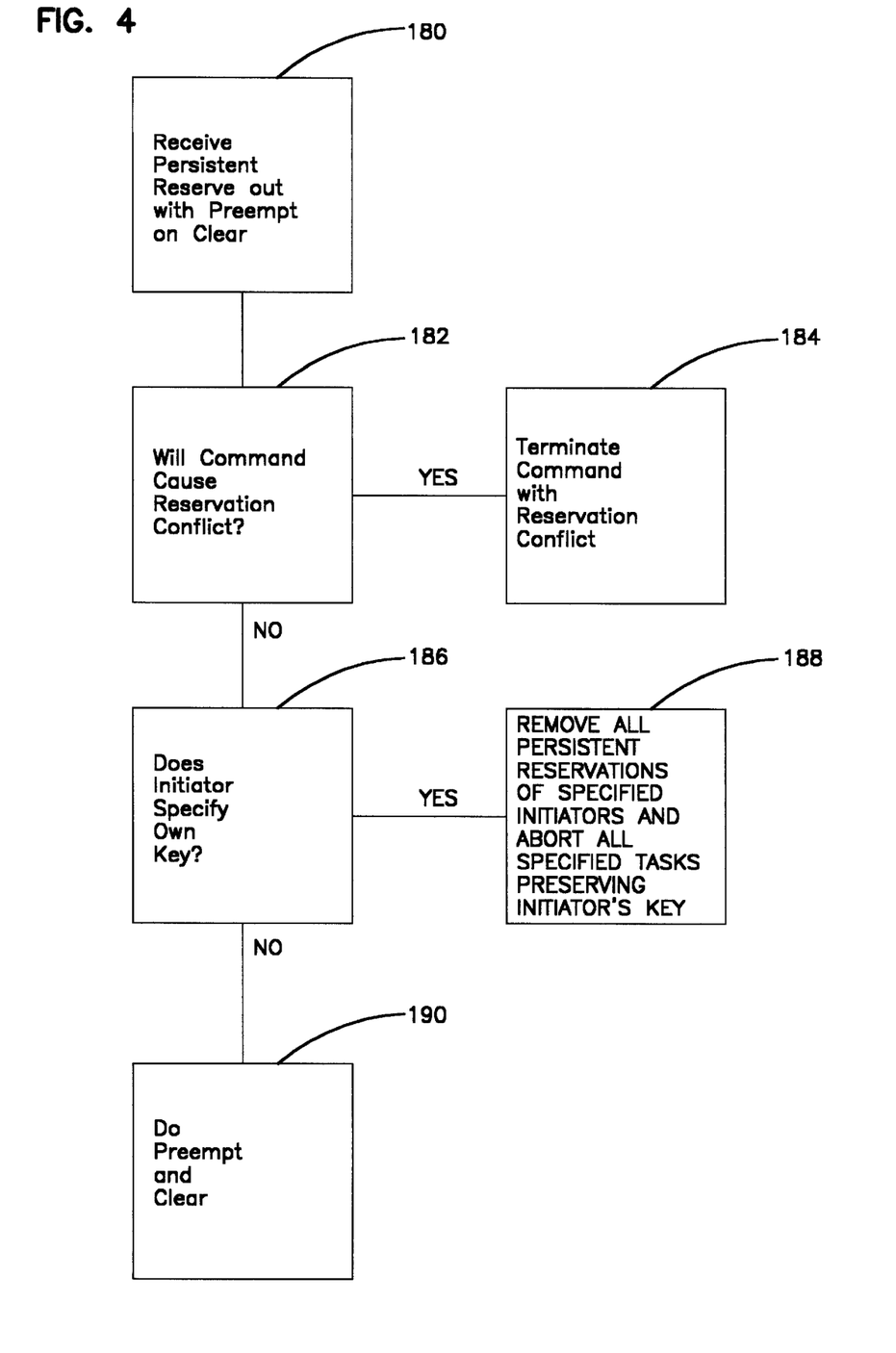
FIG. 4 is a flow chart of a sequence of steps illustrating device response to a PERSISTENT RESERVE OUT command specifying Preempt and Clear service action in accordance with the present invention.

Another aspect of the present invention includes the response of an SCSI-compliant device to a PERSISTENT RESERVE OUT command which specifies preempt and clear service action. This aspect is illustrated in FIG. 4. The method begins at block 180 when controller 114 receives a PERSISTENT RESERVE OUT command with preempt and clear service action. At block 182, controller 114 determines if the complete execution of the command would result in a RESERVATION CONFLICT if performed. If the command would result in such a RESERVATION CONFLICT controller 114 passes to block 184 and terminates the command with a RESERVATION CONFLICT response. However, if the command will not result in a RESERVATION CONFLICT controller 114 passes to block 186 and determines whether the initiator has specified its own key for the preempt and clear service action. If the initiator has so specified, then the initiator is treated uniquely in the preempt and clear process in that the initiator's key is not removed. As indicated at block 188, controller 114 removes all persistent reservations of the specified initiators and aborts all of the specified tasks while preserving the initiator's key. If the initiator has not specified its own key, controller 114 passes to block 190 and performs the preempt and clear action. Preempting and clearing of tasks, reservations, and keys is performed, followed by a reservation as described for the reserve service action (see Appendix). Preferably, the preempt and clear and reserve actions are atomic meaning that no command in the device server is ever exposed to the state of persistent reservations as it exists between the preempt and clear and the reserve portion of the persistent reserve out command specifying the preempt and clear service action.

Figure 5:
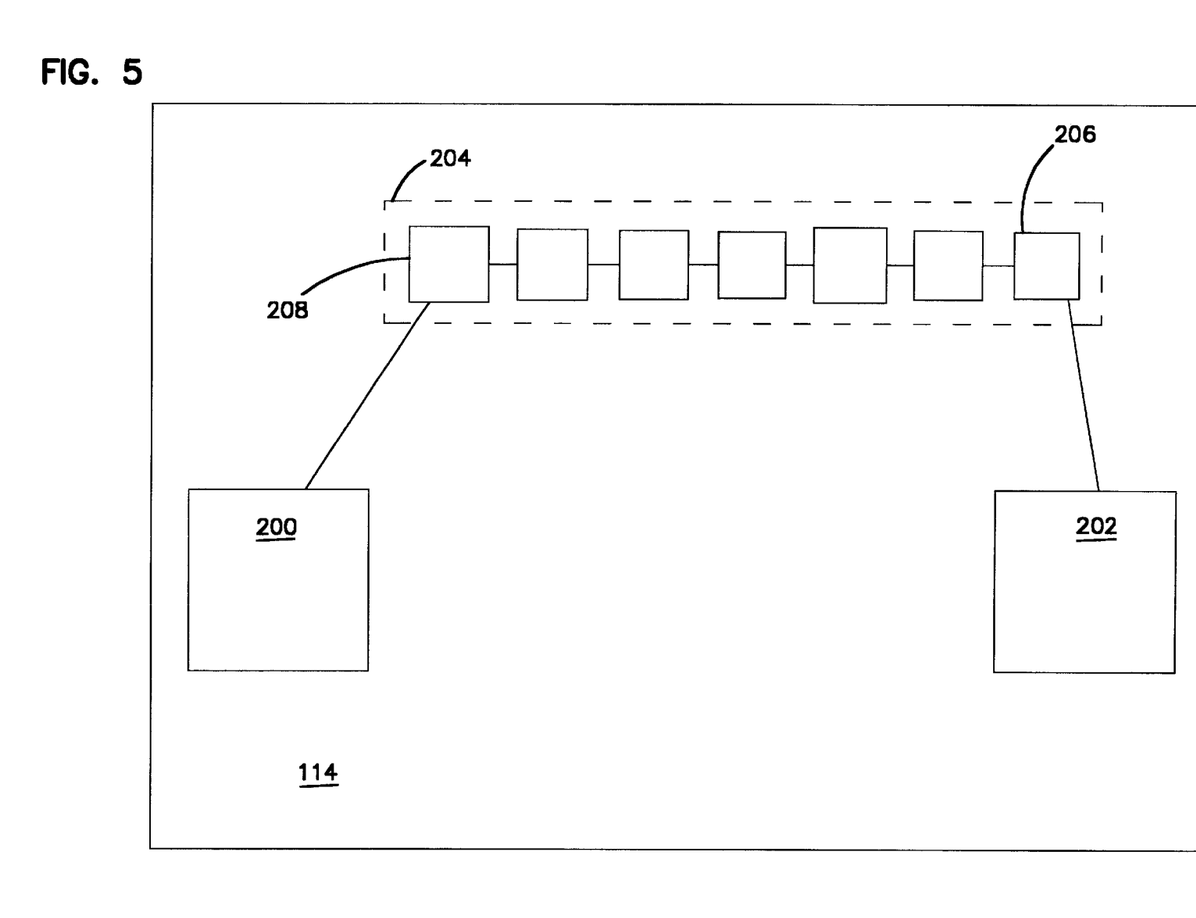
FIG. 5 is a system block diagram of a controller in accordance with the present invention.

Another aspect of the present invention is related to the execution priority with which PERSISTENT RESERVE OUT commands specifying preempt and clear service actions are given. FIG. 5 is a block diagram of a portion of controller 114 which includes receive module 200, execution module 202, and command queue 204. The structure shown in FIG. 5 illustrates a controller 114 which executes a single command at a time. As such, execution module 202 is coupled to command queue cell 206 such that contents of command queue cell 206 are loaded into command execution module 202 for execution by controller 114. Similarly, command reception module 200 is coupled to command queue cell 208 to load commands received by command reception module 200 into command queue cell 208. As commands are executed and loaded, the commands are passed from command queue cell 208 to command queue cell 206. In accordance with the present invention, when command reception module 200 receives a PERSISTENT RESERVE OUT command specifying preempt and clear service action, instead of passing the command into command queue cell 208 for execution in due course, command reception module 200 can place a high execution priority on the PERSISTENT RESERVE OUT command. Further, to ensure that the PERSISTENT RESERVE OUT command is not prevented from executing by initiator failures, command reception module 200 can ensure that any command in command queue 204 is executed or terminated. In this manner, a PERSISTENT RESERVE OUT command specifying preempt and clear service action receives a very high priority Thus, even a single-command execution system can react to a PERSISTENT RESERVE OUT command specifying preempt and clear service action like a multiple command execution system.

In conclusion, aspects of the present invention include storage drive 100 which has disc 104 coupled to a spindle motor for rotation. A head 110 in storage drive 100 is configured to read and write data upon disc 104. Storage drive 100 also includes controller 114 which is operatively couplable to small computer system interface 103 and adapted to store persistent reservation data on disc 104 in an area of disc 104 which is not affected by a FORMAT UNIT command. Controller 114 can also be adapted to receive a persistent reservation command and responsively determine if the persistent reservation information on disc 104 is accessible, and provide a CHECK CONDITION response to the command if disc 104 is not accessible. Controller 114 may be adapted to provide further information regarding the inaccessibility of disc 104, such as disc 104 being NOT READY, having a MEDIUM ERROR, or being MEDIUM FORMAT CORRUPT. Drive 100 can also include volatile memory 116 which can track the state of persistent reservations or store information related to whether persistent reservation information stored on disc 104 is known. Controller 114 can also be adapted to respond to a FORMAT UNIT command by determining if persistent reservation information is known, and if it is not known, formatting all of disc 104.

A method of the present invention includes receiving a persistent reservation command, determining if the received command will cause a change in a state of persistent reservations, and if not, checking the state of non-volatile memory, and reporting an error if non-volatile memory, such as disc 104, is not accessible. This method can be implemented on many SCSI-compliant devices including storage devices, and specifically disc drives.

Another method of the present invention includes receiving a persistent reservation command and determining if the received command will cause a change in the state of persistent reservations, and if not, taking no further action on the command. This method can be implemented in storage devices such as a disc drive.

Another method of the present invention includes receiving at least one command and loading the received command into command execution queue 204; receiving a persistent reserve out command specifying preempt and clear service action; and ensuring termination of the command which was loaded into command queue 204 based upon reception of the persistent reserve out command.

Although the present invention has been described with reference to preferred embodiments, workers skilled in the art will recognize that changes may be made in form and detail without departing from the spirit and scope of the invention. It is to be understood that even though numerous characteristics and advantages of various embodiments of the present invention have been set forth in the foregoing description, together with detail of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application without departing from the scope and spirit of the present invention. In addition, although the embodiment described herein is directed to a disc drive system, it will be appreciated by those skilled in the art that the teachings of the present invention can be applied to various other SCSI-compliant systems without departing from the scope and spirit of the present invention.

APPENDIX
PERSISTENT RESERVE IN command

The PERSISTENT RESERVE IN command is used to obtain information about persistent reservations and reservation keys that are active within a device server. This command is used in conjunction with the PERSISTENT RESERVE OUT command.

When a device server receives a PERSISTENT RESERVE IN command and RESERVE (10) or RESERVE (6) reservations are active, the command shall be rejected with a RESERVATION CONFLICT status. A PERSISTENT RESERVE IN command shall not conflict with any persistent reservation.

The actual length of the PERSISTENT RESERVE IN parameter data is available in a parameter data field. The Allocation length field in the CDB indicates how much space has been reserved for the returned parameter list. If the length is not sufficient to contain the entire parameter list, the first portion of the list shall be returned. This shall not be considered an error. If the remainder of the list is required, the application client should send a new PERSISTENT RESERVE IN command with an Allocation length field large enough to contain the entire list.

PERSISTENT RESERVE IN Service Actions

Service actions that require access to the persistent reservation and registration information may require the enabling of a nonvolatile memory within the logical unit. If the nonvolatile memory is not ready, the device server shall return CHECK CONDITION status. The sense key shall be set to NOT READY and the additional sense data shall be set as described in the TEST UNIT READY command.

The Service action codes for the PERSISTENT RESERVE IN command are Read Keys and Read Reservations.

READ KEYS

The Read Keys service action requests that the device sever return a parameter list containing a header and a complete list of all reservation keys currently registered with the device server. If multiple initiators have registered with the same key, then that key value shall be listed multiple times, once for each such registration. The keys may have been passed by a PERSISTENT RESERVE OUT command that has performed a Register service action.

READ RESERVATIONS

The Read Reservations service action requests that the device server return a parameter list containing a header and a complete list of all unique persistent reservations that are presently active in the device server. (Duplicate persistent reservations from the same initiator shall not be reported.)

PERSISTENT RESERVE OUT command

The PERSISTENT RESERVE OUT command is used to reserve a logical unit for the exclusive or shared use of a particular initiator. The command shall be used in conjunction with the PERSISTENT RESERVE IN command and shall not be used with the RESERVE and RELEASE commands.

Persistent reservations shall conflict with reservations established by the RESERVE command. Initiators performing PERSISTENT RESERVE OUT Service actions are identified by a reservation key provided by the application client. An application client may use the PERSISTENT RESERVE IN command to identify which initiators are holding conflicting or invalid persistent reservations and use the PERSISTENT RESERVE OUT command to preempt those reservations if required.

Since persistent reservations are not reset by the TARGET RESET task management function or other global actions, they may be used to enforce device sharing among multiple initiators. The PERSISTENT RESERVE OUT and PERSISTENT RESERVE IN commands provide the basic mechanism for dynamic contention resolution in multiple-initiator systems using multiple port targets. The identification of persistent reservations using the reservation key makes it possible to determine which ports hold conflicting persistent reservations and to take over persistent reservations from failing or uncooperative initiators.

When a device server receives a PERSISTENT RESERVE OUT command and RESERVE (10) or RESERVE(6) reservations are active, the command shall be rejected with a RESERVATION CONFLICT status.

A PERSISTENT RESERVE OUT command with a service action of Preempt shall not conflict with any persistent reservation for the initiator(s) being preempted. If there is a reservation by any initiator (except the initiator(s) being preempted) that conflicts with the new reservation being established by the initiator executing the PERSISTENT RESERVE OUT command with Preempt service action, the PERSISTENT RESERVE OUT command shall be rejected with RESERVATION CONFLICT status and the Preempt service action shall not be performed.

A PERSISTENT RESERVE OUT command with a service action of Preempt and Clear shall not conflict with any persistent reservation for the initiators) being preempted and cleared. If there is a reservation by any initiator (except the initiator(s) being preempted and cleared) that conflicts with the new reservation being established by the initiator executing the PERSISTENT RESERVE OUT command with Preempt and Clear service action, the PERSISTENT RESERVE OUT command shall be rejected with RESERVATION CONFLICT status and the Preempt and Clear service action shall not be performed.

A PERSISTENT RESERVE OUT command with a service action of Reserve shall be rejected with RESERVATION CONFLICT status and the reservation shall not be made if the new reservation conflicts with any persistent reservation by any initiator at the time the PERSISTENT RESERVE OUT with Reserve service action is enabled for execution.

A PERSISTENT RESERVE OUT command with a service action of Release or a service action of Clear shall not conflict with any persistent reservation by any initiator.

A PERSISTENT RESERVE OUT command with any service action except Register shall be rejected with RESERVATION CONFLICT status if the reserving initiator does not have a registered reservation key.

If a PERSISTENT RESERVE OUT command is attempted, but there are insufficient device server resources to complete the operation, the device server shall return a CHECK CONDITION status. The sense key shall be set to ILLEGAL REQUEST and the additional sense data shall be set to INSUFFICIENT RESERVATION RESOURCES. The PERSISTENT RESERVE OUT command contains fields that specify a persistent reservation Service action, the intended scope of the persistent reservation, and the restrictions caused by the persistent reservation. If a Scope field specifies a scope that is not implemented, the device server shall return a CHECK CONDITION status. The sense key shall be set to ILLEGAL REQUEST and additional sense data shall be set to INVALID FIELD IN CDB.

The capability of preserving persistent reservations and registration keys requires the use of a nonvolatile memory within the logical unit. If the nonvolatile memory is not accessible at the time that a PERSISTENT RESERVE OUT command attempts to activate the Persist Through Power Loss capability, the device server shall return CHECK CONDITION status. The sense key shall be set to NOT READY and the additional sense data shall be set as described in the TEST UNIT READY command.

PERSISTENT RESERVE OUT Service Actions

The PERSISTENT RESERVE OUT command Service actions are Register; Reserve; Release; Clear; Preempt; and Preempt and Clear.

REGISTER

The PERSISTENT RESERVE OUT command executing a Register service action registers a reservation key with a device server without generating a reservation. For each initiator that performs a PERSISTENT RESERVE OUT Register service action, the device server shall retain the reservation key until the key is changed by a new PERSISTENT RESERVE OUT command with the Register service action from the same initiator or until the initiator registration is removed by one of the following actions:

a) powering down the logical unit, if the last APTPL received by the device server was zero;

b) performing a Clear service action;

c) performing a Preempt service action;

d) performing a Preempt and Clear service action; or e) performing a Register service action from the same initiator with the value of the Service action Reservation key field set to zero.

When a reservation key has not yet been established or when the reservation key has been removed, a reservation key of zero shall be used when the initiator performs a PERSISTENT RESERVE OUT with the Register service action. When the reservation has been removed, no information shall be reported for the initiator in the Report Keys service action.

The Register service action shall be processed regardless of any active persistent reservations. All existing persistent reservations for the initiator shall be updated to reflect the new reservation key.

RESERVE

The PERSISTENT RESERVE OUT command performing a Reserve service action creates a persistent reservation having a specified scope and type.

Persistent reservations shall not be superseded by a new persistent reservation from any initiator except by execution of a PERSISTENT RESERVE OUT specifying either the Preempt or Preempt and Clear service action. New persistent reservations that do not conflict with an existing persistent reservation shall be executed normally.

A persistent reservation shall be tested for conflicts with other persistent reservations as described above and shall take effect when the task executing the PERSISTENT RESERVE OUR command enters the enabled task state.

RELEASE

The PERSISTENT RESERVE OUT command performing a Release service action removes an active persistent reservation held by the same initiator. The fields associated with the Release service action shall match fields of the active persistent reservation. It shall not be an error to send a PERSISTENT RESERVE OUT specifying a Release service action when no persistent reservation exists from that initiator. In this case, the device server shall return GOOD status without altering any other reservation. The reservation key shall not be changed by the Release service action.

The device server shall return a CHECK CONDITION status for a PERSISTENT RESERVE OUT command that specifies the release of a persistent reservation held by the requesting initiator matching some but not all of the scope, type, reservation key, and element values. The sense key shall be set to ILLEGAL REQUEST and additional sense data shall be set to INVALID RELEASE OF ACTIVE PERSISTENT RESERVATION. Attempts to release persistent reservations where none of the scope, type, reservation key, and element values match an existing persistent reservation held by the requesting initiator shall not be considered errors.

An active persistent reservation may also be released by either of the following mechanisms:

a) Power off. When the most recent APTPL value received by the device server is zero, a power off performs a hard reset, clears all persistent reservations, and removes all registered reservation keys; or b) Execution of a PERSISTENT RESERVE OUT command from another initiator with a Persistent Reserve service action of Preempt or Preempt and Clear.

A Release service action should not be performed if any operations interlocked by the persistent reservation are not yet complete.

CLEAR

The PERSISTENT RESERVE OUT command that successfully performs a Clear service action shall remove all persistent reservations for all initiators. All reservation keys shall be removed. Any commands from any initiator that have been accepted by the device server as nonconflicting shall continue normal execution.

A Unit Attention condition shall be established for all initiators for the cleared logical unit. The sense key shall be set to UNIT ATTENTION and the additional sense data shall be set to RESERVATIONS PREEMPTED.

Application clients should not use the Clear service action except during recoveries that are associated with initiator or system reconfiguration, since data integrity may be compromised. The device server shall ignore the contents of the Scope and Type fields.

PREEMPT

The PERSISTENT RESERVE OUT command that successfully performs a Preempt service action shall remove all persistent reservations for all initiators that are registered with the Service action Reservation key specified in the PERSISTENT RESERVE OUT parameter list. It shall also establish a persistent reservation for the preempting initiator. Any commands from any initiator that have been accepted by the device server as nonconflicting shall continue normal execution. It shall not be an error to send a PERSISTENT RESERVE OUT specifying a Preempt service action when no persistent reservation exists for the initiator identified by the Service action Reservation key.

A Unit Attention condition is established for the preempted initiators. The sense key shall be set to UNIT ATTENTION and the additional sense data shall be set to RESERVATIONS PREEMPTED. Subsequent commands are subject to the persistent reservation restrictions established by the preempting initiator.

The persistent reservation created by the preempting initiator is specified by the scope and type field of the PERSISTENT RESERVE OUT command and the corresponding fields in the PERSISTENT RESERVE OUT parameter list.

The registration key for the other initiators that have been preempted shall be removed by the Preempt service action. The reservation key for an initiator that has performed a Preempt service action with its own Reservation key specified in the Service action Reservation key shall remain unchanged, although all other specified releasing actions and reservation actions shall be performed.

Persistent reservations shall not be superseded by a new persistent reservation from any initiator except by execution of a PERSISTENT RESERVE OUT specifying either the Preempt or Preempt and Clear service action. New persistent reservations that do not conflict with an existing persistent reservation shall be executed normally.

PREEMPT AND CLEAR

The PERSISTENT RESERVE OUT command performing a Preempt and Clear service action removes all persistent reservations for all initiators that are registered with the Service Action Reservation key specified by the PERSISTENT RESERVE OUT parameter list. It shall also establish a persistent reservation for the preempting initiator. Every command from the initiators being preempted shall be terminated as if an ABORT TASK task management function had been performed by the preempted initiator. It shall not be an error to send a PERSISTENT RESERVE OUT specifying a Preempt and Clear service action when no persistent reservation exists for the initiator identified by the Service Action Reservation key. However, if the key is registered, the Clear portion of the action shall execute normally.

A Unit Attention condition is established for the preempted initiators. The sense key shall be set to UNIT ATTENTION and the additional sense data shall be set to RESERVATIONS PREEMPTED. Subsequent new commands and retries of commands that timed out because they were cleared are subject to the persistent reservation restrictions established by the preempting initiator.

Any Asynchronous Event Reporting operations in progress that were initiated by the device server are not affected by the Preempt and Clear service action.

The reservation key for the other initiators that have been preempted shall be removed by the Preempt and Clear service action. The reservation key for an initiator that has performed a Preempt and Clear service action with its own Reservation Key specified in the Service action Reservation key shall remain unchanged, although all other specified clearing actions, releasing actions and reservation actions shall be performed.

Persistent reservations shall not be superseded by a new persistent reservation from any initiator except by execution of a PERSISTENT RESERVE OUT specifying either the Preempt or Preempt and Clear service action. New persistent reservations that do not conflict with an existing persistent reservation shall be executed normally.

What is claimed is:

1. A disc drive, comprising:
    a spindle motor;
    a disc coupled to the spindle motor for rotation therewith;
    a head configured to read and write data upon the disc; and
    a controller coupled to the spindle motor and the head, the controller being operatively couplable to a small computer system interface and further adapted to store persistent reservation information on the disc, the controller adapted to receive a persistent reservation command and responsively determine if the persistent reservation information is accessible and selectively provide a CHECK CONDITION response to the command based upon whether the persistent reservation information is accessible.

2. The disc drive of claim 1, wherein the controller is further adapted to determine a cause of disc inaccessibility and provide information related to the cause in a sense key of the response.

3. The disc drive of claim 2, wherein the disc inaccessibility information further comprises MEDIUM FORMAT CORRUPT.

4. The disc drive of claim 1 and further comprising a volatile memory coupled to the controller and adapted to track a state of persistent reservations as communicated with the disc.

5. The disc drive of claim 4, wherein the controller is further adapted to store in the volatile memory data indicative of whether the persistent reservation information stored on the disc is known.

6. The disc drive of claim 1, wherein the controller is adapted to determine, in response to a FORMAT UNIT command, if the persistent reservation information is known, and to format the entire disc if the persistent information is not known.

7. In an apparatus that is adapted to communicate over a small computer system interface, a method of executing persistent reservation commands comprising steps of:

(a) receiving a persistent reservation out command;

(b) determining if the received command will require an update to a non-volatile memory;

(c) checking a state of non-volatile memory if the determining step (b) determines that the update is not required; and (d) reporting an error if the checking step (c) determines that the non-volatile memory has an error.

8. The method of claim 7 wherein the apparatus is a storage device.

9. The method of claim 8 wherein the storage device is a disc drive, and the non-volatile memory is a disc.

10. In an apparatus that is adapted to communicate over a small computer system interface, a method of executing persistent reservation commands comprising steps of:

(a) receiving a PERSISTENT RESERVE OUT command;

(b) determining whether persistent reservation information is known;

(c) if the determining step (b) determines that the persistent information is known, determining if an update to a non-volatile memory is required by the command;

(d) if the determining step (c) determines that an update is required, determining whether the non-volatile memory can be updated;

(e) if the determining step (d) determines that the non-volatile memory can be updated, then selectively determining whether an update to persistent reservation information is required; and (f) if the determining step (e) determines that an update is not required, then terminating the command with a response indicating GOOD status.

11. The method of claim 10 wherein the apparatus is a storage device.

12. The method of claim 11 wherein the storage device is a disc drive, and the non-volatile memory is a disc.

13. In an apparatus that is adapted to communicate over a small computer system interface, a method of executing a persistent reservation out command specifying preempt and clear service action, comprising steps of:

(a) receiving at least one command from the small computer system interface;

(b) loading the received command into a command queue;

(c) receiving a persistent reservation command after the at least one command, the persistent reservation command specifying a preempt and clear service action; and (d) ensuring termination of the at least one command stored in the command queue based upon reception of the persistent reservation out command.

14. A disc drive, comprising:

a disc;

means for reading and writing data on the disc; and control means for controlling the means for reading and writing and for tracking a state of persistent reservations related to the disc drive.

* * * * *